US008938380B2

(12) United States Patent
Jamison et al.

(10) Patent No.: US 8,938,380 B2
(45) Date of Patent: Jan. 20, 2015

(54) METHODS, DEVICES, AND KITS RELATING TO THE IMPLEMENTATION OF GELLED FLUIDS HAVING A TRANSIENT GEL MICROSTRUCTURE

(75) Inventors: Dale E. Jamison, Humble, TX (US); Jason Eric Maxey, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 382 days.

(21) Appl. No.: 13/408,005

(22) Filed: Feb. 29, 2012

(65) Prior Publication Data
US 2013/0220620 A1 Aug. 29, 2013

(51) Int. Cl.
G06G 7/48 (2006.01)
E21B 43/26 (2006.01)
E21B 23/00 (2006.01)
E21B 44/00 (2006.01)
E21B 43/00 (2006.01)

(52) U.S. Cl.
CPC ............. *E21B 43/26* (2013.01); *E21B 23/00* (2013.01); *E21B 44/00* (2013.01); *E21B 43/00* (2013.01)
USPC .......................................................... 703/10

(58) Field of Classification Search
USPC .................................................. 703/10
See application file for complete search history.

(56) References Cited

U.S. PATENT DOCUMENTS

| 4,930,576 | A | 6/1990 | Berryman et al. |
| 4,982,793 | A | 1/1991 | Holtmyer et al. |
| 5,067,565 | A | 11/1991 | Holtmyer et al. |
| 5,122,549 | A | 6/1992 | Holtmyer et al. |
| 2006/0157248 | A1 * | 7/2006 | Hoefer et al. .......... 166/300 |

FOREIGN PATENT DOCUMENTS

WO 2013/130261 A2 9/2013

OTHER PUBLICATIONS

Aslam et al. "Viscometric Measurement of Chromium(III)-Polyacrylamide Gels by Weissenberg Rheogoniometer" SPE 12639. 1984.*
International Search Report and Written Opinion for PCT/US2013/025756 dated Mar. 13, 2014.
Qi-Hui Hu et al., "Effects of Fluid Viscoelasticity on the Performance of an Axial Blood Pump Model," ASAIO Journal, vol. 58, No. 1, 2012, pp. 32-39, XP55104733.

* cited by examiner

*Primary Examiner* — Saif Alhija
(74) *Attorney, Agent, or Firm* — McDermott Will & Emery LLP; Holly Soehnge

(57) ABSTRACT

Equipment associated with a gelled fluid may be manipulated based on a stress response of the gelled fluid as determined by a gel microstructure destruction model comprising an equivalent work integral function. Further, systems and devices may be configured to manipulated equipment associated with a gelled fluid based on a stress response of the gelled fluid as determined by a gel microstructure destruction model comprising an equivalent work integral function.

20 Claims, 7 Drawing Sheets

METHODS, DEVICES, AND KITS RELATING TO THE IMPLEMENTATION OF GELLED FLUIDS HAVING A TRANSIENT GEL MICROSTRUCTURE

BACKGROUND

The present invention relates to methods, devices, and kits employing a gel microstructure destruction model that incorporates an equivalent work integral function for use in conjunction with gels having transient gel microstructures.

As used herein, the term "gelled fluid" refers to fluid that forms a network of bonds (i.e., a gel microstructure) under either static or dynamic conditions. The strength of a gelled fluid relates, in part, to the corresponding gel microstructure, which is related to, inter alia, the intermolecular forces between the gelling agents (e.g., hydrogen bonding between polysaccharide molecules). However, the intermolecular forces can be relatively weak (e.g., as compared to ionic and covalent bonds). These relatively weak bonds may break when energy is put into the gel (e.g., by flowing or mixing the gel) and can reform over time as the energy input reduces or ceases. Therefore, a single gelled fluid may have a varying strength based on the history (e.g., the shear history) of the gelled fluid.

Gel strength can effect, inter alia, the magnitude of pressure increases exerted by the gelled fluid on the medium in which it is contained (e.g., a tubing, a pipe, a wellbore, a container, and the like) when flow is started. For example in a wellbore, some operations are often performed so as to maintain the wellbore pressure within the mud weight window, i.e., the area between the pore pressure and the fracture pressure of the subterranean formation, see FIG. 1. When the overbalance pressure exceeds the fracture pressure, a fracture may be induced and lost circulation may occur. Therefore, the gel strength can be a factor to take into account when performing equipment manipulations associated with a gelled fluid in a wellbore. The term "associated with" in conjunction with equipment or equipment manipulations and a gelled fluid refers to any equipment or equipment manipulations done in conjunction with a gelled fluid where the equipment or equipment manipulations are directly or indirectly affected by the strength of the gelled fluid, which does not imply physical contact. The term "overbalance pressure," as used herein, refers to the amount of pressure in the wellbore that exceeds the pore pressure. The term "pore pressure," as used herein, refers to the pressure of fluids in the formation. Overbalance pressure is needed to prevent reservoir fluids from entering the wellbore. The term "fracture pressure," as used herein, refers to the pressure threshold where pressures exerted in excess of the threshold from the wellbore onto the formation will cause one or more fractures in the subterranean formation.

Because the gel microstructures are transient and of different strengths, working with a gelled fluid can be complex. For example, beginning flow of a relatively strong gel can lead to an increase in pressure, which in a subterranean operation can lead to fracturing of the subterranean formation and ultimately drilling fluid loss during subsequent operations. Therefore, beginning flow of gelled fluids having a substantially formed gel microstructure should be more gradual than a gelled fluid having minimal gel microstructure.

Typically, the API gel strength (API Recommended Procedure 10B-6, API Recommended Procedure 13B-1, the modified national adoption of ISO 10414-1, and API Recommended Procedure 13B-2, which generally provides a peak gel strength) has been used in conjunction with simple pressure drop equations to predict potential adverse occurrences (e.g., static peak overpressures) during the implementation of gelled fluids. Use of such a calculation method does not take into account the dynamic nature of the gel microstructure. Consequently, these calculation methods fall short in at least two ways (1) predicting adverse occurrences in a gelled fluid having a flow history and (2) inefficient equipment manipulations associated with a gelled fluid having a partially formed gel microstructure.

For example relative to the second point, inefficient equipment manipulation may occur using the simple pressure drop equations with a peak gel strength in operations that require a series of equipment manipulations where the gel microstructure of a gelled fluid undergoes break down and formation repeatedly, e.g., pipe tripping in a wellbore. By way of a nonlimiting example, pipe tripping may involve adding 90 foot lengths of pipe to a pipe string where the pipe length is added, then the pipe string is moved down the wellbore, then the pipe string is stopped so as to add another pipe length, then the pipe string is moved down the wellbore, and so on until depths of, in some cases, greater than 20,000 feet is achieved. In some instances, it can take about 30 seconds to move the pipe string down the wellbore for each pipe length and 5 minutes to attach another pipe length. Movement of the pipe string down the wellbore yields a decrease in the stress response of the gelled fluid because the microstructure of the gelled fluid is being broken. The stop in movement during attachment of another pipe length allows for the stress response of the gelled fluid to increase because the microstructure of the gelled fluid is being reformed.

FIG. 2A provides three graphs illustrating (a) the wellbore pressure as a function of time, (b) the running speed of the pipe (i.e., the speed of axial movement of the pipe in wellbore) as a function of time, and (c) the stress response of the gelled fluid as a function of time. Further, in (a) the wellbore pressure illustrative graph, the fracture pressure is indicated along with a maximum desired wellbore pressure. The area between the plot of wellbore pressure as a function of time and the maximum desired wellbore pressure is a measure of the efficiency of the operation, as illustrated in FIG. 2A(a). That is, the more area between the plot and the maximum desired wellbore pressure, the less efficient the operation because in pipe tripping operations the speed of the operation is heavily influenced by the need to stay below the fracture pressure of the formation, as is generally the case in many wellbore operations. Therefore, using current calculation methods (i.e., simple pressure drop equations with a peak gel strength) that do not take into account the shear history of gelled fluids, as illustrated in FIG. 2A(c), the same procedure for running the pipe is performed for each length of pipe, as illustrated in FIG. 2A(b). However, if the gelled fluid does not regain a gelled state stress response ($\Delta_m$) in the time required to attach another pipe length to the pipe string, then using the same procedure for running the second, third, and so on pipe lengths is inefficient in that the wellbore pressure is maintained at levels far below the maximum desired wellbore pressure, as illustrated in the area between the plot and the maximum desired wellbore pressure of FIG. 2A(a).

Approaches to model the transient nature of the gel microstructure fall short in the field because they often require detailed rheological measurements. The acquisition of detailed rheological measurements, e.g., at a well site, can be time consuming and difficult to obtain in some cases where a more specialized rheological measurement is needed. Further, the application of these detailed rheological measurements to yield useable information may be cumbersome or take more time than they save.

Therefore, a need exists for integrating the transient nature of gelled fluids into the methods and apparatuses relating to gelled fluids, e.g., in relation to subterranean operations.

SUMMARY OF THE INVENTION

The present invention relates to methods, devices, and kits employing a gel microstructure destruction model that incorporates an equivalent work integral function for use in conjunction with gels having transient gel microstructures.

Some embodiments of the present invention may involve manipulating an equipment associated with a gelled fluid based on a stress response of the gelled fluid as determined by a gel microstructure destruction model comprising an equivalent work integral function.

Some embodiments of the present invention may involve entering an input related to the gelled fluid into the computer so as to produce an output; and manipulating an equipment associated with the gelled fluid based on the output. The computer may include a processor, a memory, and storage executing a computer program, where the program includes an executable instruction that causes the computer to: perform a regression to produce a stress response of a gelled fluid using a gel microstructure destruction model having a work integral; and produce an output based on the stress response.

Some embodiments of the present invention may involve determining a first manipulation procedure for manipulating an equipment associated with the gelled fluid based on a stress response of the gelled fluid as determined by implementing a value of a rheological property of a gelled fluid in a gel microstructure destruction model comprising an equivalent work integral function; and performing a second manipulation procedure based on the first manipulation procedure.

Some embodiments of the present invention may involve manipulating an equipment associated with a gelled fluid; receiving feedback from the equipment; performing a real-time numerical approximation of an equivalent work integral function; implementing the equivalent work integral function in a gel microstructure destruction model to produce a stress response of the gelled fluid; and continuing to manipulate the equipment associated with the gelled fluid based on the stress response.

In some embodiments, a kit may include at least one component of a gelled fluid; and a set of instructions for manipulating a piece of equipment associated with the gelled fluid based on a gel microstructure destruction model comprising an equivalent work integral function.

In some embodiments, a computer may include a processor, a memory, and storage executing a computer program, where the program includes an executable instruction that causes the computer to: perform a regression to produce a stress response of a gelled fluid using a gel microstructure destruction model comprising an equivalent work integral function; and produce an output based on the stress response.

In some embodiments, a non-transitory machine-readable medium encoded may include instructions executable by a processing system to perform a method of estimating a manipulation procedure for manipulating an equipment associated with the gelled fluid, where the instructions include receiving a value of a rheological property of a gelled fluid; and determining, by a processor and based on the value, a manipulation procedure for manipulating an equipment associated with the gelled fluid, wherein determining involves a gel microstructure destruction model comprising an equivalent work integral function.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
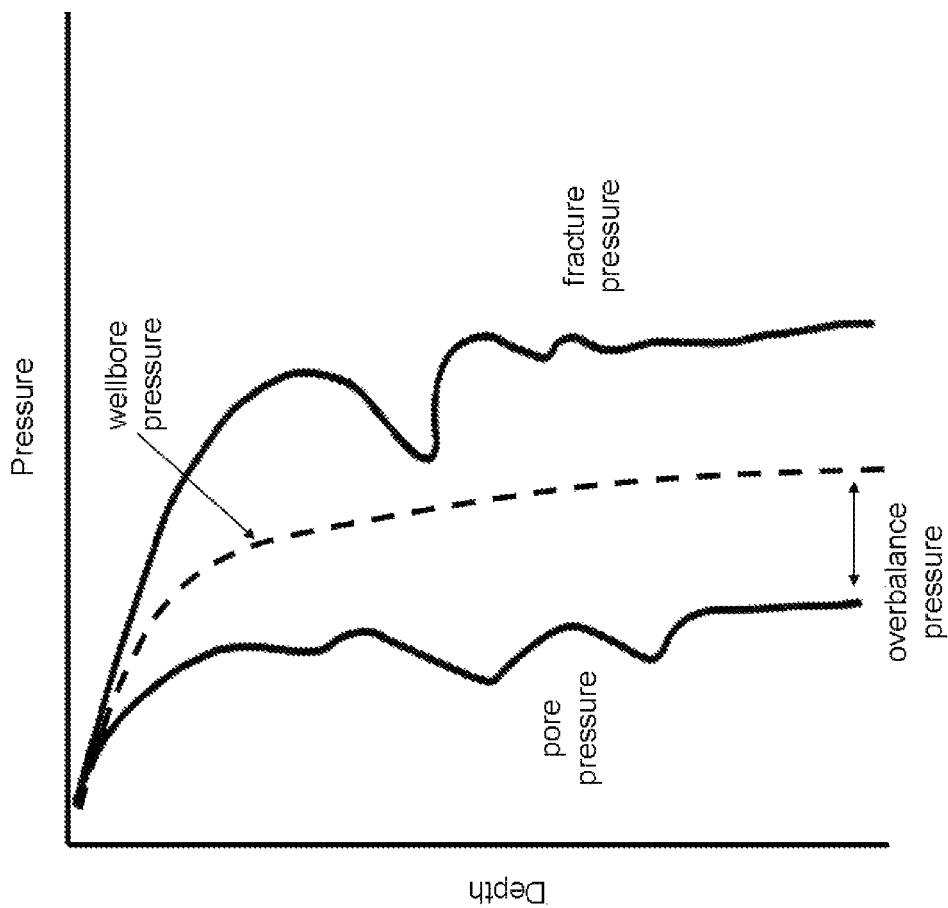
FIG. 1 provides an illustration of the mud weight window.

The present invention relates to methods, devices, and kits employing a gel microstructure destruction model that incorporates an equivalent work integral function for use in conjunction with gels having transient gel microstructures.

The present invention relates to gel microstructure destruction models having at least one equivalent work integral function (described further herein (GMDM/EWIF of the present invention), which takes into account the transient nature of the gel microstructure. The present invention provides for methods that employ a GMDM/EWIF of the present invention for manipulating equipment associated with gelled fluids, which in some embodiments may advantageously mitigate the damage and increase the lifetime of the equipment and related structures. For example, in drilling a wellbore in a subterranean formation using a gelled drilling fluid, the rate at which a pump for circulating the gelled drilling fluid is ramped up to operating speed may be derived from a GMDM/EWIF of the present invention so as to advantageously mitigate pump damage and the potential for unwanted subterranean formation fracture due to a pressure spikes outside the mud weight window as described above. It should be noted that providing or determining methods for manipulating equipment (e.g., a procedure) as used herein includes (1) providing or determining a first method and (2) performing a second method based on the first method, and unless otherwise specified is optionally provided for in the embodiments described herein.

Also, a GMDM/EWIF of the present invention may provide more efficient equipment manipulations that save time and consequently reduce costs, e.g., more efficient pipe tripping to minimize the pressure difference between the actual wellbore pressure and the maximum desired wellbore pressure. For example, in subterranean operations costs can be in the neighborhood of about $400,000/day and up to $1,500,000 depending on the location and nature of the operation. Efficient methods that have the potential to cumulatively shave a day or more off an operation or series of operations would be of great value.

The methods of the present invention employing a GMDM/EWIF of the present invention may, in some embodiments, advantageously be applicable for on-the-fly changes in equipment manipulations. In some operations involving gelled fluids, the composition of the gelled fluid may change over time, e.g., the incorporation of formation cuttings into drilling fluids, which may change the formation and destruction of the gel microstructures. Methods of employing a GMDM/EWIF of the present invention and incorporating the potential composition changes may allow for real-time changes in procedures so as to efficiently perform the operation while minimizing potential pressure spikes.

The present invention also provides inputting values (e.g., rheological values or compositional parameters of the gelled fluids) into an algorithm comprising a GMDM/EWIF of the present invention that then through computers, computerized equipment, and/or computer programs may control equipment manipulations (e.g., a computer connected to a pump) associated with the gelled fluid. The use of computers, computerized equipment, and/or computer programs for employing an algorithm comprising a GMDM/EWIF of the present invention may advantageously be more efficient and safer when controlling equipment manipulations associated with a gelled fluid. Further, in some embodiments, an algorithm comprising a GMDM/EWIF of the present invention used in conjunction with computers, computerized equipment, and/or computer programs may be responsive to real-time changes in the gelled fluids, for example, the addition of cuttings to the gelled fluids during drilling operations may change the dynamics of the gel microstructure.

Further, the present invention provides for kits that include gelled fluids (or components thereof) and a set of instructions based on a GMDM/EWIF of the present invention. In some embodiments, the set of instructions may be a table based on the concentration of the components in a gelled fluid that may guide a worker to more efficiently manipulate equipment associated with the gelled fluid actually in use. These kits may enable workers to more efficiently manipulate equipment associated with the gelled fluid.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit. Whenever a range of values is given, any subset of that range (between the highest and lowest point) is an acceptable alternative range in the embodiments of the present invention.

I. Gelled Fluids

As noted above, the term "gelled fluid" as used herein refers to fluid that forms a network of bonds (i.e., gel microstructure) under either static or dynamic conditions. As used herein, the term "gelled fluid," unless otherwise specified, refers generally to gelled fluids having any degree of gel microstructure formation including, but not limited to, fully formed, fully broken, or some intermediate state therebetween. Generally, a fluid is considered a gelled fluid for this description when the fluid exhibits the characteristics of a thixotropic fluid, a fluid where the stress response at a certain shear rate is time dependent, a fluid that exhibits stress when shear is initiated and that stress is time dependent, a fluid where when shear is initiated and continued at a specific shear rate the stress measured at that shear rate decreases over time, a fluid that when a shear force is stopped returns to a higher stress state over a fixed time, or a fluid that exhibits more than one of these characteristics.

One skilled in the art, with the benefit of this disclosure, should understand that a fluid may be considered a gelled fluid at a given temperature and/or pressure, e.g., at deeper depths in some subterranean formations. In some embodiments, the temperature of the gelled fluid may be about 10° C. or below. In some embodiments, the temperature of the gelled fluid may be about 0° C. or below. In some embodiments, the temperature of the gelled fluid may range from a lower limit of about −50° C., −25° C., 0° C., 50° C., or 100° C. to an upper limit of about 350° C., 300° C., 250° C., 200° C., 150° C., 100° C., 50° C., or 25° C., wherein the temperature of the gelled fluid may range from any lower limit to any upper limit and encompass any subset therebetween.

In some embodiments, gelled fluids may comprise components capable for forming crosslinked networks. Suitable components capable of forming a crosslinked network may include, but are not limited to, polymers (crosslinked or non-crosslinked), surfactants (crosslinked or non-crosslinked), surfmers (crosslinked or non-crosslinked), chelating agents, weighting agents, colloidal particles, liquid crystals, and the like, or any combination thereof. Further, suitable components capable of forming a crosslinked network may include, but are not limited to, molecules and particles capable of interacting via hydrogen bonding, dipole-dipole interactions, London dispersion forces, pi-pi bonding, magnetic attraction, electronic attraction, and the like, or any combination thereof.

Nonlimiting examples of suitable components of gelled fluids may include precipitated barite, barite, submicron barite, hematite, ilmentite, manganese tetraoxide, galena, calcium carbonate, formation cuttings, clay particles, sugars, polysaccharides, biopolymers, derivatives polysaccharides and biopolymers that contain one or more monosaccharide units (galactose, mannose, glucoside, glucose, xylose, arabinose, fructose, glucuronic acid, or pyranosyl sulfate), synthetic polymers, organic carboxylated polymer, crosslinking agents, and the like, or any combination thereof. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and combinations thereof.

Suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and combinations thereof. In certain embodiments, the components of gelled fluids may comprise an acrylamide/2-(methacryloyloxy)ethyltrimethylammonium methyl sulfate copolymer. In certain embodiments, the components of gelled fluids may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference. Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as components of gelled fluids.

Suitable crosslinking agents as components of gelled fluids may comprise a borate ion, a metal ion, or similar component that is capable of crosslinking at least two molecules of the gelling agent. Examples of suitable crosslinking agents as components of gelled fluids include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to, the following: the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

Suitable fluids for use in conjunction with the present invention that may be or comprise a gelled fluid may include, but are not limited to, treatment fluids, drilling fluids, drill-in fluids, insulating fluids, lost circulation fluids, stimulation fluids, sand control fluids, completion fluids, acidizing fluids, scale inhibiting fluids, water-blocking fluids, clay stabilizer fluids, fracturing fluids, frac-packing fluids, gravel packing fluids, wellbore strengthening fluids, sag control fluids, coal slurries, colloidal fluids, particle suspension fluids, food fluids (e.g., mustard and ketchup), personal care fluids (e.g., lotions, hair gels, toothpaste), inks, cements, adhesives, paints, waste streams (e.g., tailings suspension), and the like, or any hybrid thereof.

II. Gel Microstructure Destruction Models

In some embodiments of the present invention, a gel microstructure destruction model having an equivalent work integral function (GMDM/EWIF) of the present invention may be used for predicting the stress response ($\sigma(t)$) of a gelled fluid over time. As described above, employing calculation methods for the stress response of a gelled fluid over time may advantageously allow for, inter alia, more efficient equipment manipulations while staying within the mud weight window of a wellbore. As used herein, the term "equivalent work integral function" ($\int \dot{\gamma}(t)dt$) ("EWIF") refers to an integral of the transient shear experienced by the fluid as mechanical stress (e.g., flow, vibration, or shearing) is initiated and gel microstructure is broken down, thus describing a cumulative amount of work which has been performed on the fluid in order to break the gel microstructure and return to steady state flow conditions ($\sigma_\infty$). Generally, the EWIF accounts for the transient nature of the gel microstructure of a gelled fluid, i.e., the shear history of the gelled fluid. Inclusion of a GMDM/EWIF may advantageously provide for, in some embodiments, (1) invariant parameters for gel microstructure break down, (2) the same parameters and gel microstructure break down models for conditions when shear is variable, and/or (3) inclusion of the effects of shear induced by pipe rotation.

Suitable microstructure destruction models may include, but are not limited to, those models listed in Table 1 (including hybrid models thereof) that include EWIFs.

TABLE 1

Nonlimiting Examples of Gel Microstructure Destruction Models having an Equivalent Work Integral Function of the Present Invention

| | |
|---|---|
| Summation of Exponential Decays | $\sigma(t) = \sigma_\infty + \Delta_t \sum_i A_i e^{-(t/k_i) \int \dot{\gamma}(t)dt}$ |
| | $\sum_i A_i = 1$ |
| | $\Delta_t = \Delta_m(1 - e^{-t_s/K_B})$ |
| | $\Delta_m = \sigma_{peak} - \sigma_\infty$ |
| Binding Isotherm-Type Decay | $\sigma(t) = \sigma_\infty + \Delta_t \left(1 - \dfrac{(k_2 t)^n}{(k_1 \int \dot{\gamma}(t)dt)^n + t^n}\right)$ |
| Polynomial Decay | $\sigma(t) = \sigma_\infty + \dfrac{\Delta_t}{t^{k_i \int \dot{\gamma}(t)dt}}$ | where:
$\sigma(t)$ is the stress response observed at time, t
$\sigma_\infty$ is the steady state stress at the shear rate of the test (i.e., maximal destruction of microstructure)
$\sigma_{peak}$ is the maximum value of gel strength when the gel microstructure is completely formed
$\dot{\gamma}$ is the shear rate
$t_S$ is time static (i.e., $\dot{\gamma} = 0$, a quiescent fluid)
$A_i$ are the relative peak magnitudes of each decay, where the sum of $A_i = 1$
n is a Hill slope constant <= 1
$k_i$ are the decay for each decay mode modeled
$\Delta_m$ is the maximum gel strength, $\sigma_{peak}$, minus $\sigma_\infty$
$\Delta_t$ is the gel strength component after $t_s$ when structure can reform
$K_B$ is the time constant for structure building and is a function of temperature, pressure, and kinetics One skilled in the art, with the benefit of this disclosure, should understand the plurality of possible work terms ($k_i$)

depending on the nature of the network of bonds of gel microstructure. Suitable work terms may include, but are not limited to, weak bonding constants, strong bonding constants, and ionic strength.

Choice of a GMDM/EWIF of the present invention may be dependent on the composition of the gelled fluid (both chemical and concentration) (e.g., the concentration and structure of the various chemicals and additives in gelled fluids). One skilled in the art, with the benefit of this disclosure should be able to identify a GMDM to include therein an EWIF of the present invention, such that the dominant forces experienced by the gelled fluid are taken into account. For example, a Summation of Exponential Decays model having an EWIF of the present invention, see Table 1, may be one of the more versatile models. The Summation of Exponential Decays model having an EWIF of the present invention allows for incorporating more than one dominant force experienced by the gelled fluid. This may advantageously allow for taking into account several decay parameters like temperature, hydrostatic pressure, and kinetics while accounting for the transient nature of the gel microstructure of the gelled drilling fluid.

Another example of what to consider when selecting an appropriate GMDM/EWIF of the present invention, the Binding Isotherm-Type Decay model having an EWIF of the present invention, see Table 1, may be more appropriate for gelled fluids having components with competitive growth and decay pathways. By way of nonlimiting example, a Binding Isotherm-Type Decay model having an EWIF of the present invention may be better suited for calculation methods involving the stress response of a gelled fluid having a biologically active component where at least a portion of the gelled microstructure is formed by ligands and receptors.

One skilled in the art, with the benefit of this disclosure, should understand that a GMDM/EWIF of the present invention may be adjusted as needed for methods where the gel microstructure has reached steady state or is at an intermediate state (non-steady state).

In some embodiments, it may be advantageous to employ a GMDM/EWIF of the present invention accounting for non-steady state conditions when determining the stress response of a non-steady state gelled fluid so as to determine an appropriate equipment manipulation. By way of another nonlimiting example, a gelled fluid may be flowed then stopped, thereby creating a shear history for the fluid, and then the flow may be restarted before the gel microstructure has completely reformed. By taking into account the shear history of the gelled fluid with a GMDM/EWIF of the present invention, the stress response of a gelled fluid may be modeled using from the current gel microstructure (e.g., a not fully formed gel microstructure) rather than always assuming the completely formed gel microstructure as is often done in simple pressure drop equations as discussed above. Such a capability may advantageously save time and consequently costs. For example, during pipe tripping (an example procedure provided above), accounting for the shear history of the gelled fluid at various depths along the wellbore with a GMDM/EWIF of the present invention may allow for a pipe to be introduced into the wellbore at a faster running speed, or during restarting fluid flow, the pumps may be restarted with a faster ramping profile without causing pressure spikes that can lead to formation fracture. By way of another nonlimiting example, to minimize pressure spike within the wellbore (e.g., to prevent exceeding the fracture pressure of a zone within a subterranean formation), a GMDM/EWIF of the present invention may be used to determine the acceptable limits of pump speed ramping (up or down) and/or pipe rotation speed. Therefore, a GMDM/EWIF of the present invention may be useful in methods involving equipment manipulations associated with gelled fluids by taking into account the status of the gel microstructure of the gelled fluid by accounting for the shear history of the gel (including as a function of location, e.g., depth in a wellbore).

In some embodiments, the EWIF may be numerically approximated from real-time data. Some embodiments may involve measuring operational parameters over time to build a real-time EWIF that can be used to predict the state of the gel microstructure so as to guide further equipment manipulations. Suitable operational parameters to be measured may include, but are not limited to, the flow rate of the gelled fluid, the rpm of pipe rotation, the running speed, the vibration intensity, and the like, or any combination thereof.

By way of nonlimiting example, pipe tripping may involve rotation of the pipe and fluid pumping during insertion into or removal from the wellbore where the running speed of the pipe, the rpm of the pipe rotation, and the pumping speed are monitored. Monitoring of these operational parameters may provide the shear history which can be used to numerically approximate the EWIF, which in a gel microstructure model may be used to predict the pressure of the gelled fluid further down the wellbore and thereby provide parameters regarding the further manipulation of the pipe during pipe tripping so as to minimize formation damage (e.g., unwanted fracturing at pressures in excess of the mud weight window).

III. Methods

Some embodiments of the present invention may involve determining a stress response of a gelled fluid using a GMDM/EWIF of the present invention and manipulating equipment associated with the gelled fluid based on the stress response. Suitable equipment manipulations for use in conjunction with the present invention may be any change or movement of a piece of equipment (or component thereof) that causes a portion of the gel microstructure to break down. Examples of suitable equipment manipulations may include, but are not limited to, ramping a pump up to an operating speed, changing the operating speed of a pump, stopping a pump, inserting at least a portion of a pipe into the gelled fluid, removing at least a portion of a pipe from the gelled fluid, rotating a pipe at least partially in contact with the gelled fluid, rotating a drill bit or component thereof at least partially in contact with the gelled fluid, moving a mixing element at least partially in contact with the gelled fluid, pushing a piston at least partially through a gelled fluid, vibrating a container holding a gelled fluid, applying pressure to a container holding a gelled fluid (e.g., squeezing a bottle), applying pressurized fluid (liquid or gas) to a gelled fluid, and the like, or any combination thereof. Nonlimiting examples of equipments that may be manipulated may include pumps, engines, downhole motors, rotary devices (e.g., a mixer), shakers, pipes, presses, ink cartridges, and the like or equipment as part of a system like fluid transportation systems, fluid mixing systems, rotary systems of drilling rigs, coal slurry systems, container filling systems, container evacuating systems, printer cartridges, and the like, or relevant subsystems thereof.

Some embodiments may involve measuring a rheological property of a gelled fluid, determining a stress response of the gelled fluid using a GMDM/EWIF of the present invention using the measured rheological property, and manipulating equipment associated with the gelled fluid based on the stress response. In some embodiments, the rheological properties may be used to determine the work terms. Measurement of said rheological property may be by laboratory instrumentation, in-the-field instrumentation, sensors on or in the equipment, by derivation from the performance of the equipment while in the field (e.g., calculating an effective k, see Table 1, at "normal operating speeds" then adjusting equipment manipulations based on the effective k values derived from the performance of the in-field equipment), or any combination thereof. Suitable rheological properties for use in conjunction with the present invention may include, but are not limited to, shear stress, normal stress, oscillatory stress, shear modulus, pressure while drilling (PWD) readings, and the like, or any combination thereof. One skilled in the art, with the benefit of this disclosure, should understand that the rheological properties may depend on, inter alia, the concentration of the components capable for forming a gel microstructure in the gelled fluid and the nature of the interactions between said components.

By way of nonlimiting example, some embodiments may involve measuring the shear stress and normal stress of a gelled fluid in a laboratory at various concentrations of at least one component of the gelled fluid, e.g., of a polymer capable of forming a gel network. Then, at a drill site, a gelled fluid may be prepared with specific concentrations of the components of the gelled fluid, which may or may not be at the concentrations tested in the laboratory. The specific components and concentrations thereof may then be input into an algorithm comprising a GMDM/EWIF of the present invention via a computer, such that the algorithm inputs the appropriate rheological values into a GMDM/EWIF of the present invention. The algorithm may then produce stress response values for the specific fluid used at the drill site, and these stress response values may be further used by the algorithm (or another algorithm) to manipulate equipment (e.g., the rate at which pumps are ramped up and down).

By way of another nonlimiting example, some embodiments may involve measuring the shear stress of a gelled drilling fluid during drilling with an in-line rheometer. The shear stress values may be used in the determination of the stress response of the gelled drilling fluid using a GMDM/EWIF of the present invention (perhaps as part of an algorithm stored on a computer or as part of a computer program). On-the-fly measurement and determination of the stress response may advantageously allow for more accurate accounting for the increasing incorporation of formation cuttings into the gelled drilling fluid during drilling. The resultant stress response values may then be used to adjust equipment manipulations associated with the gelled drilling fluid, e.g., rotation speed of the drill bit, removal efficacy of formation cuttings from the gelled drilling fluid by changing the operational parameters of shakers or centrifuges, pumping speed of the circulating pumps, and the like.

Some embodiments may involve monitoring operational parameters, determining a stress response of the gelled fluid using a GMDM/EWIF of the present invention using the monitored operational parameters, and manipulating equipment associated with the gelled fluid based on the stress response. As described above, suitable operational parameters to be measured may include, but are not limited to, the flow rate of gelled fluid, the rpm of pipe rotation, the running speed, the pipe position (e.g., depth), torque, the vibration intensity, downhole pressure, pump speed, and the like, or any combination thereof.

Some embodiments of the present invention may involve determining a stress response of a gelled fluid using a GMDM/EWIF of the present invention and manipulating equipment associated with the gelled fluid based on the stress response so as to maintain the wellbore pressure within the mud weight window, i.e., the area between the pore pressure and the fracture pressure of the subterranean formation, as described above in relation to FIG. 1.

Some embodiments of the present invention may involve a real-time numerical approximation of the EWIF to determine a stress response of a gelled fluid using a GMDM/EWIF of the present invention and manipulating equipment associated with the gelled fluid based on the stress response, which in some embodiments may be to maintain the wellbore pressure within the mud weight window. In some embodiments, the repeated steps may optionally include measuring (or deriving) a rheological property of the gelled fluid.

In some embodiments, the real-time measurements and/or real-time numerical approximations may be done at set time intervals (e.g., twice an hour or once a minute), essentially continuously (e.g., on-the-fly), on demand (e.g., at a worker's request), or any combination thereof. In some embodiments, real-time measurement may be fed directly into real-time numerical approximations so as to manage operational procedures real-time.

Figure 2A:
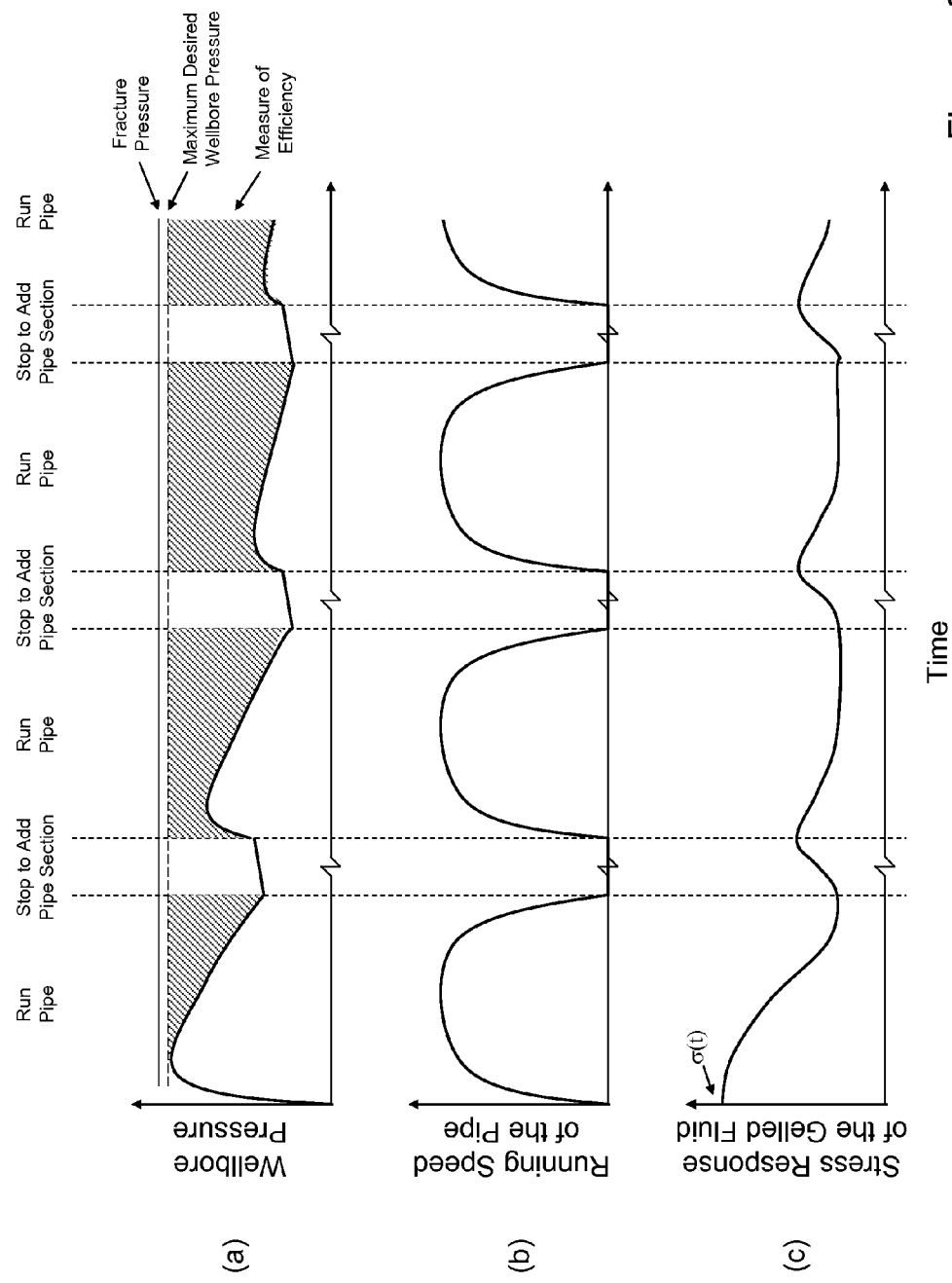
FIG. 2A provides an illustration of a pipe tripping operation not using a gel microstructure destruction model having at least one equivalent work integral function of the present invention.
Figure 2B:
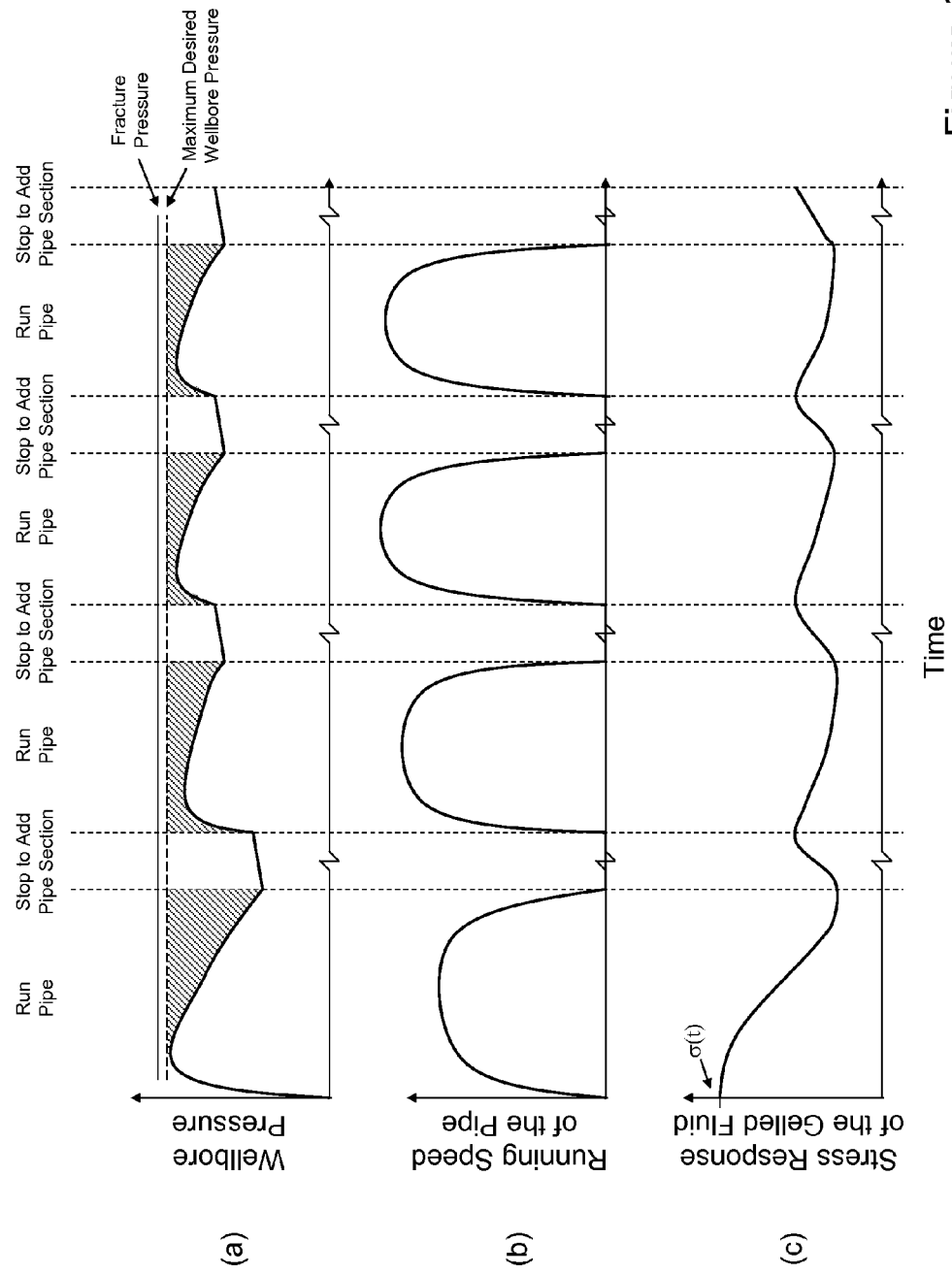
FIGS. 2B-C provide illustrations of pipe tripping operations using a gel microstructure destruction model having at least one equivalent work integral function of the present invention.
Figure 2C:
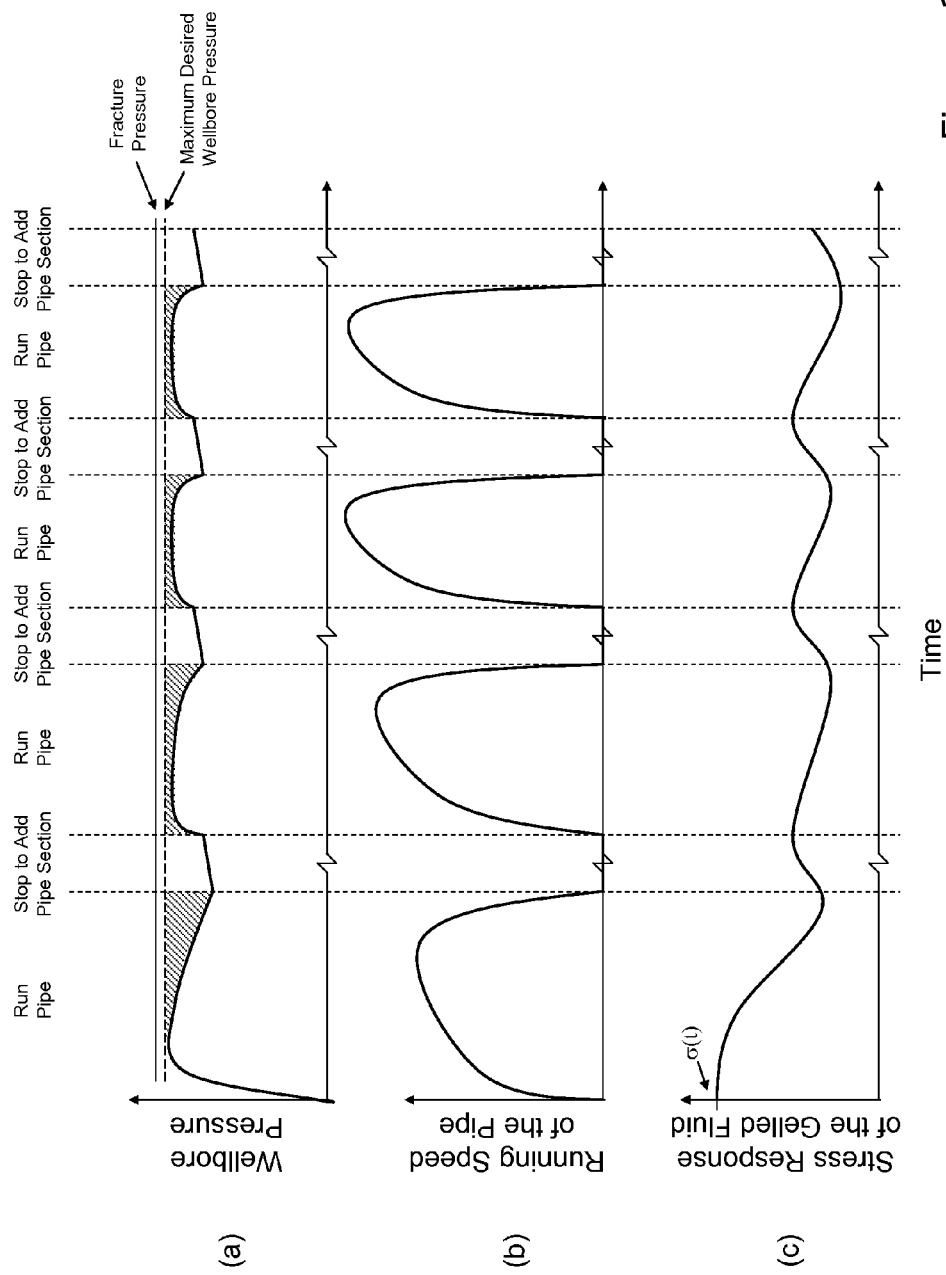

Methods for manipulating equipment may advantageously take less time when employing a GMDM/EWIF of the present invention. By way of nonlimiting example relative to pipe tripping (a general procedure provided above), by using a GMDM/EWIF of the present invention to determine the stress response of a gelled fluid in a wellbore, the time to move the pipe string down the wellbore for each pipe length may be reduced by one-tenth to half as illustrated in the comparison of FIGS. 2A-2C. As described above in relation to FIG. 2A, each figure provides three graphs illustrating (a) the wellbore pressure as a function of time, (b) the running speed of the pipe as a function of time, and (c) the stress response of the gelled fluid as a function of time. Further, in the wellbore pressure illustrative graph (a), the fracture pressure is indicated along with a maximum desired wellbore pressure. The area between the plot of wellbore pressure as a function of time and the maximum desired wellbore pressure is a measure of the efficiency of the operation, as illustrated in plot (a) of FIGS. 2A-C. That is, the more area between the plot and the maximum desired wellbore pressure, the less efficient the operation because in pipe tripping operations the speed of the operation is heavily influenced by the need to stay below the fracture pressure of the formation, as is generally the case in many wellbore operations.

As described above, in current calculation methods (i.e., simple pressure drop equations with a peak gel strength) that do not take into account the shear history of gelled fluids, the same procedure for running the pipe is performed for each length of pipe, as illustrated in FIG. 2A(b), which can lead to inefficient operations.

In contrast, by determining the running speed of the pipe string (i.e., an example of an equipment manipulation) using a GMDM/EWIF of the present invention, the running speed may be changed to minimize the area between the plot of the actual wellbore pressure and the maximum desired wellbore pressure, as illustrated in plot (a) of FIGS. 2B-C.

FIG. 2B(b) provides an illustration of increasing the running speed while maintaining the general ramping/deceleration procedure. FIG. 2C provides an illustration of further applications of implementing a GMDM/EWIF of the present invention, where the procedure for ramping up and slowing down the pipe during insertion may be changed so as to provide for even higher efficiencies. In FIG. 2C(b), the running speed of the pipe is increased as at a slower rate and reaches a higher peak speed than in plot (b) of FIGS. 2A-B. This allows for the pressure to stay closer to the maximum desired wellbore pressure throughout the entire insertion of the pipe length. Taking into account the shear history of the gelled fluid (FIGS. 2B-C as compared to FIG. 2A) may provide for operations involving gelled fluids that are faster and more efficient thereby saving time, which in some embodiments can translate to real cost savings. As described above, the EWIF of the present invention may be determined based on rheological data, determined based on the response of equipment to the gelled fluid, numerically approximated in real-time, or some hybrid thereof.

In some embodiments, methods employing a GMDM/EWIF of the present invention may be relative to a subterranean formation. In some embodiments, a gelled fluid may be used in a subterranean operation where the gelled fluid is in a wellbore penetrating a subterranean formation, introduced into a wellbore penetrating a subterranean formation, and/or circulated in a wellbore penetrating a subterranean formation. Suitable subterranean operations may include, but are not limited to, drilling operations, drill-in operations, pipe tripping operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, and sag control operations. Suitable subterranean operations may be used in full-scale operations or pills. As used herein, a "pill" is a type of relatively small volume of specially prepared treatment fluid placed or circulated in the wellbore.

By way of nonlimiting example, a cementing operation may involve pumping a cement slurry (i.e., a gelled fluid) into a wellbore between the wellbore surface and a pipe string so as to create a surface casing. Typically in these types of cementing operations, the cement slurry being introduced into the wellbore is displacing a drilling fluid, which may be a gelled drilling fluid. Use of a GMDM/EWIF of the present invention for both the gelled drilling fluid and the cement slurry may advantageously provide for faster displacement and higher displacement efficiency of a gelled drilling fluid with a cement slurry while preventing fracturing of the wellbore. Fracturing of the wellbore in this type of operation may lead, inter alia, to loss of fluids (drilling fluids and/or cement slurry) into the formation and/or weaker surface casings because the wellbore near the casing has been damaged.

In some embodiments, methods employing a GMDM/EWIF of the present invention may be relative to the transportation of gelled fluids. In some embodiments, the transportation of gelled fluids may occur in pipelines, in slag pits, in trenches, by free flow, or any combination thereof. By way of nonlimiting example, transporting coal slurries may involve a series of pumps. The cycling of the various pumps may be controlled by a program comprising a GMDM/EWIF of the present invention.

In some embodiments, methods employing a GMDM/EWIF of the present invention may be relative to the manufacturing of gelled fluids or other products comprising gelled fluids. In relation to manufacturing methods, a GMDM/EWIF of the present invention may be employed when transporting gelled fluids, mixing gelled fluids, mixing gelled fluids with other additives, filling containers with gelled fluids, emptying containers with gelled fluids, and the like. By way of nonlimiting example, gelled petroleum fluids used in manufacturing processes may be mixed with other ingredients where the motion of the mixer is at least partially controlled by a GMDM/EWIF of the present invention.

IV. Devices and Systems

In some embodiments, non-transitory machine-readable mediums may be encoded with instructions (e.g., an algorithm or series of algorithms) executable by a processing system to perform a method of determining a stress response of a gelled fluid using a GMDM/EWIF of the present invention and producing an output based on the stress response. The instructions may, in some embodiments, comprise code for receiving a value; determining, by a processor and based on the value, a stress response of a gelled fluid using a GMDM/EWIF of the present invention; and producing an output based on the stress response.

Suitable values to receive for use in conjunction with the present invention may include, but are not limited to, rheological measurements made by laboratory instrumentation, rheological measurements made with in-the-field instrumentation, rheological measurements made with sensors on or in the equipment, rheological measurements derived from the performance of the equipment, rheological parameters derived from theory, performance values of the equipment being manipulated (e.g., running speed, torque, pumping speed, and/or pressure), compositional parameters of a gelled fluid to be employed (e.g., chemical structure and/or concentration of at least one component), a value derived therefrom (e.g., a value or constant derived from any of the rheological measurements), a value related thereto (e.g., a value or constant related to any of the rheological measurements or the compositional parameters of the gelled fluid), or any combination thereof.

Suitable outputs derived from use of the present invention may include, but are not limited to, an electrical signal capable of manipulating equipment, a set of instructions for a worker to operate equipment, an alarm, or any combination thereof. By way of nonlimiting example, a set of instructions for a worker to operate equipment may include a series of steps to follow (e.g., a series of drilling speeds relative to depth in the wellbore), desired parameters for manipulating equipment (e.g., a ramping speed for a pump or the time interval for inserting a length of pipe in a pipe tripping operation), a series of prompt or signals to a worker as to when to perform and/or change an equipment manipulation (e.g., a series of red/yellow/green lights that provide feedback regarding an operation underway), and the like. By way of another nonlimiting example, an alarm may be suitable for alerting a worker as to when the wellbore pressure is within a preset standard deviation of the fracture pressure, thereby alerting the worker to change an equipment manipulation (e.g., slow down the insertions of a pipe length in pipe tripping operations, slow down flow of the gelled fluid, or rotate a pipe faster or slower).

In some embodiments, computers comprising a processor, a memory, and a storage may execute a program comprising executable instructions (e.g., an algorithm or series of algorithms) that cause a computer to perform a regression to determine a stress response of a gelled fluid using a GMDM/EWIF of the present invention and produce an output based on the stress response. Suitable outputs are provided above. In some embodiments, the executable instructions may further cause the computer to measure (or derive) a rheological property of the gelled fluid. Suitable rheological measures are provided above. In some embodiments, the executable instructions may be capable of receiving an input, e.g., the inputs listed above.

In some embodiments, non-transitory machine-readable mediums or computers may further comprise at least one library, which the executable instructions of the non-transitory machine-readable medium or the computer may access when determining a stress response of a gelled fluid using a GMDM/EWIF of the present invention. In some embodiments, libraries may include stored rheological values for a plurality of gelled fluid compositions or components thereof (relative to the chemical structure and/or concentration).

In some embodiments, a device or a system may comprise a non-transitory machine-readable medium or a computer according to any embodiments described above. For simplicity and ease of understanding, such devices and systems will be referred to as a "stress response device" and "stress responsive systems," respectively.

Suitable stress responsive devices may be devices that interact (directly or indirectly) with gelled fluids, which may include, but are not limited to, pumps, engines, downhole motors, rotary device (e.g., a mixer), shakers, pipes, presses, ink cartridges, and the like.

Suitable stress responsive systems may be systems that interact (directly or indirectly) with gelled fluids, which may include, but are not limited to, fluid transportation systems, fluid mixing systems, rotary systems of drilling rigs, coal slurry systems, container filling systems, container evacuating systems, printer cartridges, and the like, or relevant subsystems thereof.

V. Kits

In some embodiments, determining a stress response of a gelled fluid using a GMDM/EWIF of the present invention and manipulating equipment associated with the gelled fluid based on the stress response may be done at separate locations. By way of nonlimiting example, a gelled fluid may be tested in a laboratory to determine the stress response that is then translated into a set of instructions for manipulating equipment associated with the gelled fluid such that the actual manipulation occurs at a wellbore site, in a manufacturing plant, or in a pipeline.

In some embodiments, the stress response may be determined for a series of first gelled fluids (e.g., with different component concentrations or with different base fluids) based on a GMDM/EWIF of the present invention, and a set of instructions may be developed for manipulating a piece of equipment associated with a second gelled fluid based on the stress response of the first gelled fluids. By way of nonlimiting example, a set of instructions may include a table indicating preferred equipment manipulation parameters based on the concentration of at least one component in a gelled fluid.

In some embodiments, a kit may comprise a gelled fluid and a set of instructions for manipulating a piece of equipment associated with the gelled fluid based on a GMDM/EWIF of the present invention. In some embodiments, a kit may comprise a component for making a gelled fluid and a set of instructions for manipulating a piece of equipment associated with a gelled fluid comprising the component, where the set of instructions are based on a GMDM/EWIF of the present invention.

In some embodiments, a kit may comprise a gelled fluid or component thereof and a library for use in conjunction with a non-transitory machine-readable medium or computer according to any embodiments described herein. In some embodiments, a kit may comprise a gelled fluid or component thereof and a set of values that are suitable inputs for a non-transitory machine-readable medium or computer according to any embodiments described herein that produce an output (e.g., any of the outputs listed above).

Some embodiments of the present invention may involve a method comprising: providing a gelled fluid; and manipulating an equipment associated with the gelled fluid based on a stress response of the gelled fluid as determined by a gel microstructure destruction model comprising an equivalent work integral function.

Some embodiments of the present invention may involve a method comprising: providing a gelled fluid; providing a computer; entering an input related to the gelled fluid into the computer so as to produce an output; and manipulating an equipment associated with the gelled fluid based on the output. The computer may comprise a processor, a memory, and storage executing a computer program, the program comprising: an executable instruction that causes the computer to: perform a regression to produce a stress response of a gelled fluid using a gel microstructure destruction model having a work integral; and produce an output based on the stress response.

Some embodiments of the present invention may involve a method comprising: providing a value of a rheological property of a gelled fluid; determining a first manipulation procedure for manipulating an equipment associated with the gelled fluid based on a stress response of the gelled fluid as determined by implementing the value in a gel microstructure destruction model comprising an equivalent work integral function; and performing a second manipulation procedure based on the first manipulation procedure.

Some embodiments of the present invention may involve a method comprising, in order: manipulating an equipment associated with a gelled fluid; receiving feedback from the equipment; performing a real-time numerical approximation of an equivalent work integral function; implementing the equivalent work integral function in a gel microstructure destruction model to produce a stress response of the gelled fluid; and continuing to manipulate the equipment associated with the gelled fluid based on the stress response.

In some embodiments, a kit may comprise at least one component of a gelled fluid; and a set of instructions for manipulating a piece of equipment associated with the gelled fluid based on a gel microstructure destruction model comprising an equivalent work integral function.

In some embodiments, a computer may comprise a processor, a memory, and storage executing a computer program, the program comprising an executable instruction that causes the computer to: perform a regression to produce a stress response of a gelled fluid using a gel microstructure destruction model comprising an equivalent work integral function; and produce an output based on the stress response.

In some embodiments, a non-transitory machine-readable medium encoded may include instructions executable by a processing system to perform a method of estimating a manipulation procedure for manipulating an equipment associated with the gelled fluid, the instructions may comprise code for: receiving a value of a rheological property of a gelled fluid; and determining, by a processor and based on the value, a manipulation procedure for manipulating an equipment associated with the gelled fluid, wherein determining involves a gel microstructure destruction model comprising an equivalent work integral function.

To facilitate a better understanding of the present invention, the following examples of preferred embodiments are given. In no way should the following examples be read to limit, or to define, the scope of the invention.

EXAMPLES

Example 1

Figure 3:
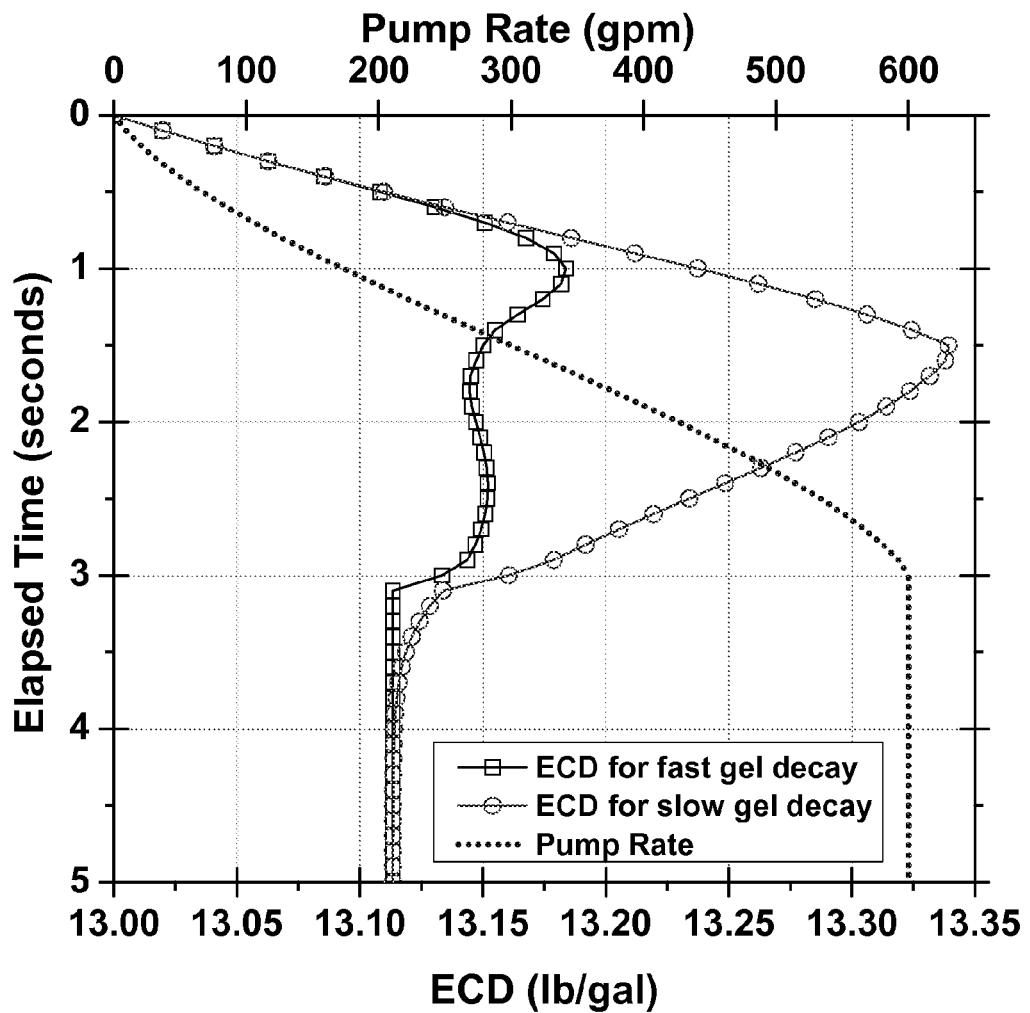
FIG. 3 provides an application of a gel microstructure destruction model having an equivalent work integral function (GMDM/EWIF) of the present invention to transient downhole pressure changes.

Application of a GMDM/EWIF of the present invention to transient downhole pressure changes is presented in FIG. 3. In this, a simulation of the increase in equivalent circulating density (ECD) of a 13-lb/gal mud is followed during a period of ramping up pump rates from no flow to 600-gpm. For this example, the simple single exponential decay model below was employed.

$$\sigma(t) = \sigma_\infty + \Delta_t \sum_i A_i e^{-(t/k_i) \int \dot{\gamma}(t) dt}$$

The transient ECD was followed at a true vertical depth of 5000-ft as the pump rate was increased to 600-gpm (gallons per minute) over 3 seconds for a mud with an API gel strength of 30-lb/100 ft². In FIG. 3, a comparison of two hypothetical gelled fluids with the same pump ramping profile is presented, one in which the exponential decay model used a fast decay constant (lower k), and one in which a slow decay constant (higher k) was used. The utility of inclusion of a transient gel break down model is readily observed in comparison of the fast and slow decay cases. For all other conditions held the same, a gelled fluid with a fast decay parameter produces a significantly lower rise in ECD than does the same fluid with a slower decay parameter.

Implementation of this model may be in response to the conditions of the wellbore. For example, if the fracture pressure of a section of the wellbore were at an ECD of 13.2-13.3 lb/gal, then the fluid having a fast gel decay would be more appropriate for use in conjunction with said wellbore.

Example 2

Testing was performed on a flow loop, which is part of the Dynamic Testing Facility at the University of Tulsa in which several muds were flowed through a vertical annular section of pipe and the pressure drop was monitored. The experimental flow loop provides temperature control, an annular test section, and a recirculation loop. A mud sample (13.5-lb/gal synthetic invert emulsion fluid) was prepared and mixed in a recirculation tank and then circulated throughout the system at 45° F. and 15 gallons per minute. In these tests a vertical annular test section of approximately 9 feet with a 2" ID pipe with a 0.5" OD stainless steel pipe inside was used. Two pressure transducers, 19-inches apart, were used to obtain pressure differential readings during the test.

The flow experiment was set up such that the test fluid in the annular section was isolated from the loop by two ball valves. After the isolated fluid had remained quiescent for a prescribed period of time (a 10-minute sample and a 30-minute sample), allowing the gel microstructure to grow in the fluid, the valves were manually opened. On opening the flowing loop fluid would be diverted from the recirculating loop to the static annular column and the pressure drop measured over the test section as the gel microstructure broke down. This procedure was run twice for each quiescent time, and the measured pressure drop for each test is shown in FIG. 4A for the 30-minute sample and in FIG. 4B for the 10-minute sample.

Figure 4A:
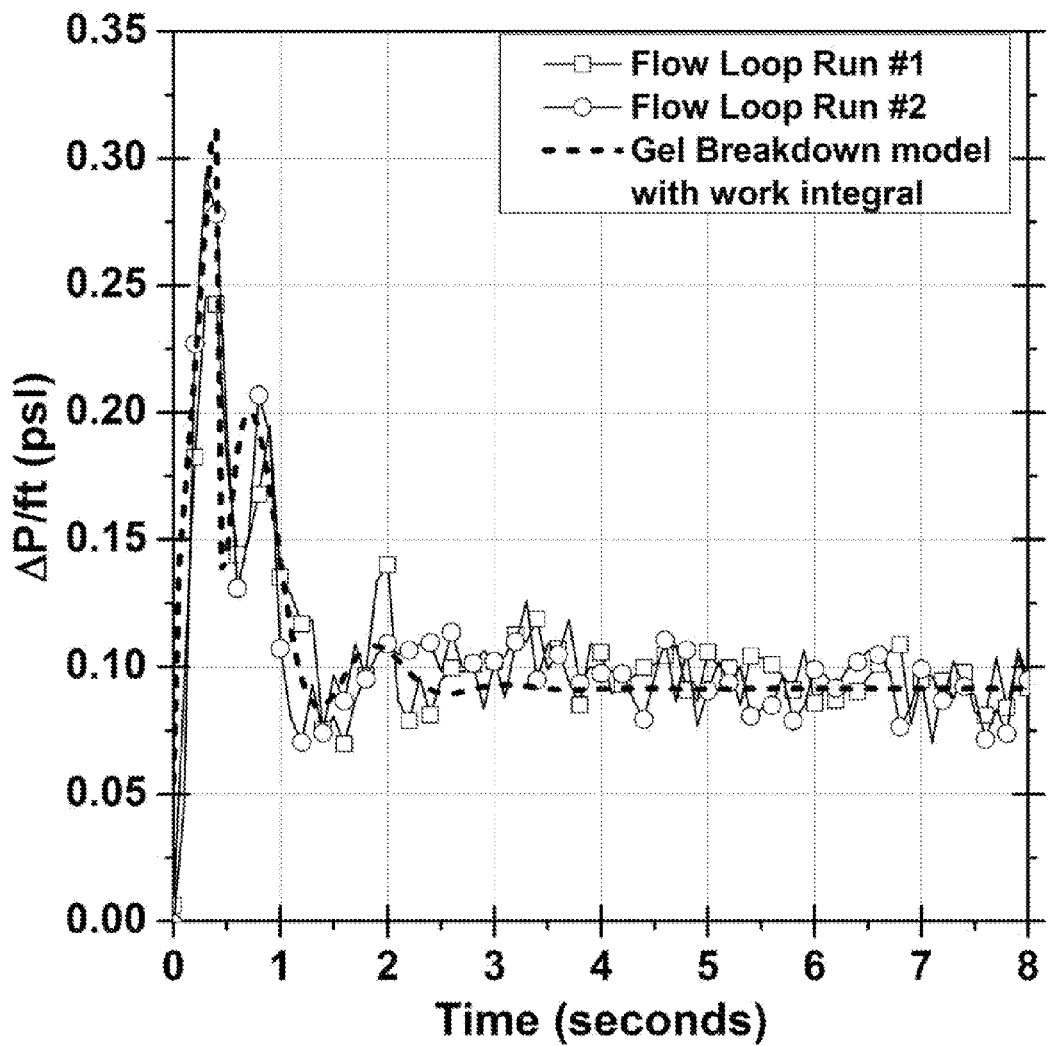
FIGS. 4A-B provide the raw data and calculated stress response using a gel microstructure destruction model having at least one equivalent work integral function of the present invention for two runs with gel-formation periods of 30-minutes and 10-minutes, respectively.
Figure 4B:
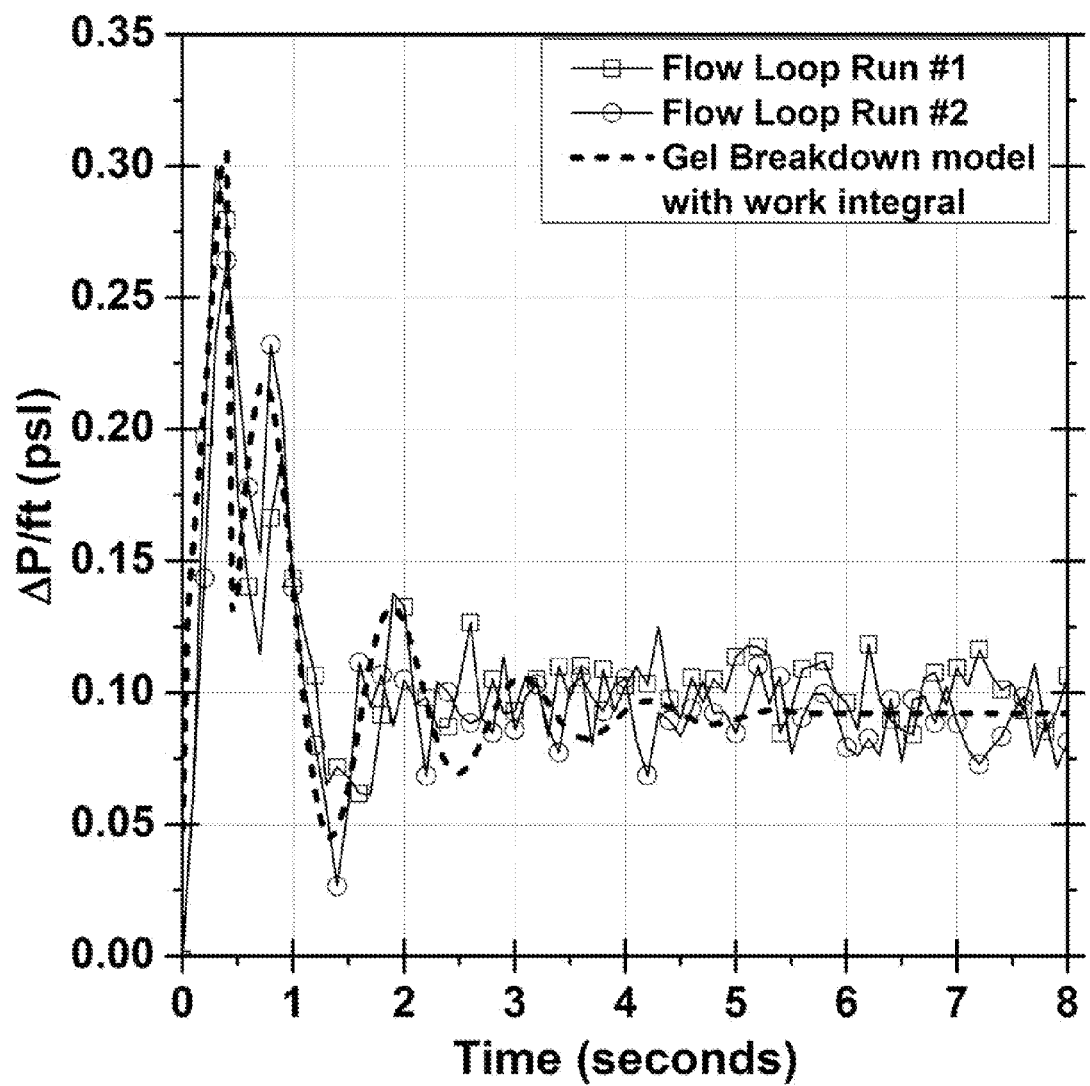

As shown in the raw data of FIGS. 4A-B, the measured pressure spiked when the ball valves were opened. The initial pressure spike (through about the first 0.4 s) observed is resultant from combined effects of the inertial, frictional, and gel components. After this initial pressure spike the dominant influences on pressure drop arise from vibrations, gel, and viscous effects (from about 0.4 s through about 2.75 s). Once steady state is achieved (from about 2.75 s on) the pressure drop is predominantly a viscous effect. The vibrations in the pressure drop measurements were found to be due to the elasticity of the acrylic tubing of the vertical test section and from other components in the flow loop system.

From gross observation of this data it is readily apparent that a period of decay occurs, during which the microstructure arising from gel microstructure growth is broken down and the pressure drop in the pipe decreases from a maximum to steady state. This decay, if modeled and related to invariant parameters, would be most useful in the prediction of transient downhole pressures arising from flow of gelled fluids.

In order to isolate the gel effects on the transient pressures, a first-principals approach to evaluation of the raw data was taken, beginning with Navier-Stokes equations for fluid motion. Simply stated the Navier-Stokes equation says the pressure is the sum of a number of contributing parameters (as shown below) where $f_i$ terms are generally included to describe contributions to transient pressure changes, which in this example includes a GMDM/EWIF of the present invention and oscillatory pressure fluctuations due to system elasticity.

$$\frac{dP}{dx} = -\rho \frac{dV}{dt} + \mu \frac{d^2 V}{dt^2} + \rho g + f_i$$

In this example, the following contributions were used to derive the formulas below that was, in turn, used to model the test results. First, a GMDM/EWIF of the present invention using the Summation of Exponential Decays model from Table 1 was used accounting for the momentum effects, frictional pressure drop, and hydrostatic pressure. Further, $f_{i2}$ was included to account for the oscillatory pressure fluctuations due to system elasticity. One skilled in the art, with the benefit of this disclosure, should understand that many contributions could be included and that for simplicity one may include only the dominant contributions.

$$\sigma(t) = \sigma_\infty + \Delta_t \sum_i A_i e^{-(t/k_i) \int \dot{\gamma}(t) dt} + f_{i2}$$

$$\sum_i A_i = 1$$

$$\Delta_t = \Delta_m (1 - e^{-t_s/K_B})$$

$$\Delta_m = \sigma_{peak} - \sigma_\infty$$

$$f_{2i} = P_f e^{-\zeta \omega_n t_i} \cos(\omega_d t_i - \varphi)$$

where:
$P_f$ is a forcing function at $t_i$=0.4 s (where $t_i$ is empirically determined from the first pressure spike)
$\omega_d = \omega_n (1-\omega_n^2)^{1/2}$ is a damped frequency (empirically determined)
$\zeta$ is the damping factor (empirically determined)
$\varphi$ is the phase angle (empirically determined)
One skilled in the art with the benefit of this disclosure should understand that other $f_{i2}$ functions for oscillatory pressure fluctuations due to system elasticity may be used to model a system with elasticity or other vibration like responses coupled with transient gel responses.

The results of the above numerical model applied to the data of FIGS. 4A-B. In both cases, a good approximation of the transient pressure was obtained, demonstrating the efficacy of this approach.

These examples demonstrate the efficacy of employing a GMDM/EWIF of the present invention to calculate the stress response of gelled fluids in subterranean applications. The stress response can be used to assist and/or define equipment manipulations that optimize the efficacy of the equipment manipulations while staying within a given mud weight window so as to not inadvertently fracture a formation, as shown in Example 1. One skilled in the art with the benefit of this disclosure should understand the far reaching potential of these calculation methods in conjunction with equipment manipulations to other areas involving gelled fluids, like treatment fluids, drilling fluids, drill-in fluids, insulating fluids, lost circulation fluids, stimulation fluids, sand control fluids, completion fluids, acidizing fluids, scale inhibiting fluids, water-blocking fluids, clay stabilizer fluids, fracturing fluids, frac-packing fluids, gravel packing fluids, wellbore strengthening fluids, sag control fluids, coal slurries, colloidal fluids, particle suspension fluids, food fluids (e.g., mustard and ketchup), personal care fluids (e.g., lotions, hair gels, toothpaste), inks, cements, adhesives, paints, waste streams (e.g., tailings suspension), and the like, or any hybrid thereof.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a gelled fluid; and
manipulating an equipment associated with the gelled fluid based on a stress response of the gelled fluid as determined by a gel microstructure destruction model comprising an equivalent work integral function of $\int \dot{\gamma}(t)dt$ where $\dot{\gamma}$ is shear rate and t is time.

2. The method of claim 1, wherein on the gel microstructure destruction model comprising the equivalent work integral function comprises at least one selected from the group consisting of a summation of exponential decays model, a binding isotherm-type decay model, a polynomial decay model, and any hybrid thereof.

3. The method of claim 1, wherein manipulating the equipment involves at least one selected from the group consisting of ramping a pump up to an operating speed, changing the operating speed of a pump, stopping a pump, inserting at least a portion of a pipe into the gelled fluid, removing at least a portion of a pipe from the gelled fluid, rotating a pipe at least partially in contact with the gelled fluid, rotating a drill bit or component thereof at least partially in contact with the gelled fluid, moving a mixing element at least partially in contact with the gelled fluid, pushing a piston at least partially through a gelled fluid, vibrating a container holding a gelled fluid, applying pressure to a container holding a gelled fluid, applying pressurized fluid to a gelled fluid, and any combination thereof.

4. The method of claim 1, wherein the gelled fluid is in a wellbore penetrating a subterranean formation.

5. The method of claim 1, wherein the gelled fluid is in a pipeline.

6. The method of claim 1, wherein the gelled fluid is at least one selected from the group consisting of a treatment fluid, a drilling fluid, a drill-in fluid, an insulating fluid, a lost circulation fluid, a stimulation fluid, a sand control fluid, a completion fluid, an acidizing fluid, a scale inhibiting fluid, a water-blocking fluid, a clay stabilizer fluid, a fracturing fluid, a frac-packing fluid, a gravel packing fluid, a wellbore strengthening fluid, a sag control fluid, a coal slurry, a colloidal fluid, a particle suspension fluid, a food fluid, a personal care fluid, an ink, a cement, an adhesive, a paint, a waste stream, and any hybrid thereof.

7. The method of claim 1, wherein the gelled fluid comprises at least one component selected from the group consisting of a crosslinked polymer, a non-crosslinked polymer, a crosslinked surfactant, a non-crosslinked surfactant, a crosslinked surfmer, a non-crosslinked surfmer, a weighting agent, a colloidal particle, a liquid crystal, and any combination thereof.

8. The method of claim 1, wherein the gelled fluid comprises at least one component capable of forming a crosslinked network by interacting in at least one way selected from the group consisting of hydrogen bonding, dipole-dipole interaction, London dispersion forces, pi-pi bonding, magnetic attraction, electronic attraction, and any combination thereof.

9. The method of claim 1, wherein the gelled fluid is at about 10° C. or below.

10. The method of claim 1, wherein the gelled fluid is at about 0° C. or below.

11. The method of claim 1, wherein the gelled fluid is at about 100° C. to about 350° C.

12. A method comprising:
providing a gelled fluid;
providing a computer comprising a processor, a memory, and storage executing a computer program, the program comprising:
an executable instruction that causes the computer to:
perform a regression to produce a stress response of a gelled fluid using a gel microstructure destruction model having an equivalent work integral function of $\int \dot{\gamma}(t)dt$ where $\dot{\gamma}$ is shear rate and t is time; and
produce an output based on the stress response;
entering an input related to the gelled fluid into the computer so as to produce the output; and
manipulating an equipment associated with the gelled fluid based on the output.

13. The method of claim 12, wherein the computer program interacts with a library.

14. The method of claim 12, wherein on the gel microstructure destruction model comprising the equivalent work integral function comprises at least one selected from the group consisting of a summation of exponential decays model, a binding isotherm-type decay model, a polynomial decay model, and any hybrid thereof.

15. The method of claim 12, wherein the input is at least one selected from the group consisting of a rheological measurement made by laboratory instrumentation, a rheological measurement made with in-the-field instrumentation, a rheological measurement made with sensors on or in the equipment, a rheological measurement derived from the performance of the equipment, a rheological parameter derived from theory, a performance value of the equipment, a compositional parameter of the gelled fluid, a value derived therefrom, a value relating thereto, and any combination thereof.

16. The method of claim 12, wherein the output is at least one selected from the group consisting of an electrical signal capable of manipulating equipment, a set of instructions for a worker to operate equipment, an alarm, and any combination thereof.

17. The method of claim 12, wherein manipulating the equipment involves at least one selected from the group consisting of ramping a pump up to an operating speed, changing the operating speed of a pump, stopping a pump, inserting at least a portion of a pipe into the gelled fluid, removing at least a portion of a pipe from the gelled fluid, rotating a pipe at least partially in contact with the gelled fluid, rotating a drill bit or component thereof at least partially in contact with the gelled fluid, moving a mixing element at least partially in contact with the gelled fluid, pushing a piston at least partially through a gelled fluid, vibrating a container holding a gelled fluid, applying pressure to a container holding a gelled fluid, applying pressurized fluid to a gelled fluid, and any combination thereof.

18. A computer comprising a processor, a memory, and storage executing a computer program, the program comprising:

an executable instruction that causes the computer to:

perform a regression to produce a stress response of a gelled fluid using a gel microstructure destruction model comprising an equivalent work integral function of $\int \dot{\gamma}(t) \, dt$ where $\gamma$ is shear rate and $t$ is time; and produce an output based on the stress response.

19. The computer of claim 18, wherein the output is selected from the group consisting of an electrical signal capable of manipulating an equipment, a set of instructions for a worker to operate an equipment, an alarm, and any combination thereof.

20. A device comprising the computer of claim 18.

* * * * *